(12) United States Patent
Huang et al.

(10) Patent No.: US 8,847,921 B2
(45) Date of Patent: Sep. 30, 2014

(54) ELECTRONIC DEVICE WITH INVISIBLE LIGHT TOUCH PANEL

(75) Inventors: Sheng-Shan Huang, New Taipei (TW); Shih-Wang Kao, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 184 days.

(21) Appl. No.: 13/584,838

(22) Filed: Aug. 14, 2012

(65) Prior Publication Data

US 2013/0241880 A1 Sep. 19, 2013

(30) Foreign Application Priority Data

Mar. 19, 2012 (TW) .............................. 101109315 A

(51) Int. Cl.
*G06F 3/042* (2006.01)
(52) U.S. Cl.
USPC ...... 345/175; 345/173; 362/23.02; 362/23.03
(58) Field of Classification Search
CPC .................................................. G06F 3/0421
USPC ............ 362/23.01–23.05, 600, 602; 345/173, 345/175
See application file for complete search history.

(56) References Cited

U.S. PATENT DOCUMENTS

| 8,339,373 | B2 * | 12/2012 | Chang ........................... 345/173 |
| 8,451,235 | B2 | 5/2013 | Xuan |
| 8,517,564 | B2 * | 8/2013 | Kim et al. ..................... 362/231 |
| 8,545,087 | B2 * | 10/2013 | Kim et al. ..................... 362/628 |
| 2003/0147257 | A1 | 8/2003 | Lee |
| 2010/0289755 | A1 | 11/2010 | Zhu |
| 2011/0148816 | A1 | 6/2011 | Jhu |
| 2011/0298752 | A1 * | 12/2011 | Hsieh et al. ................... 345/175 |
| 2012/0249438 | A1 * | 10/2012 | Kim et al. ..................... 345/173 |

FOREIGN PATENT DOCUMENTS

| CN | 201638110 U | 11/2010 |
| TW | 200928917 | 7/2009 |
| TW | 201040815 | 11/2010 |
| TW | 201122960 | 7/2011 |

OTHER PUBLICATIONS

Office action mailed on May 30, 2014 for the Taiwan application No. 101109315, filing date: Mar. 19, 2012, p. 1 line 12-14, p. 2-5 and p. 6 line 1-6.

* cited by examiner

*Primary Examiner* — Stephen F Husar
*Assistant Examiner* — James Cranson, Jr.
(74) *Attorney, Agent, or Firm* — Winston Hsu; Scott Margo

(57) ABSTRACT

An electronic device with an invisible light touch panel is disclosed in the present invention. The electronic device includes a circuit board, a visible light source, a light guiding plate, a panel and a cover. The circuit board includes a plurality of invisible light emitters and receivers. The light guiding plate includes an active area and an inactive area. The invisible light outputted from the invisible light emitter transmits to the invisible light receiver via the active area, and the visible light outputted from the visible light source can transmit to the inactive area. The cover is disposed above the light guiding plate. A hole is formed on a surface of the cover, and a position of the hole corresponds to the inactive area on the light guiding plate, so the visible light outputted from the visible light source passes through the cover via the inactive area and the hole.

12 Claims, 5 Drawing Sheets

ELECTRONIC DEVICE WITH INVISIBLE LIGHT TOUCH PANEL

BACKGROUND OF THE INVENTION

1. Field of the Invention

The present invention relates to an electronic device with a touch panel, and more particularly, to an electronic device with an invisible light touch panel, and a light guiding plate of the electronic device can be an indicating button or a light bar for decoration.

2. Description of the Prior Art

A conventional infrared touch panel disposes a plurality of infrared receivers and a plurality of infrared emitters respectively on four sides of a circuit board. The infrared emitters disposed around the circuit board simultaneously generate infrared signals to the opposite infrared receivers, so an infrared network can be formed above a surface of the circuit board. When a user purposes to control the touch panel, the user can utilize an object to slide over the touch panel. The object can be a finger or a stylus. A part of infrared signal is interdicted when the object moves into the infrared network. Because each combination is composed of one infrared emitter and one infrared receiver, the infrared touch panel can distinguish a position of the interdicted infrared signal. Then, a controller can analyze infrared signal variation, and transmit a result to a processor, so that the processor can show position information of the object via the touch panel, or execute the other application programs according to the position information by software.

For completely transmitting the infrared signal outputted from each infrared emitter to the corresponding infrared receiver, a light guide plate of the conventional infrared touch panel covers the whole area on the touch panel. The infrared network formed by the infrared emitters and the infrared receivers also covers the display area on the touch panel completely. The infrared network can detect any interference by the object when the object moves into the infrared network, and can distinguish the position information by digital calculation. Therefore, the light guide plate of the conventional infrared touch panel has huge volume. For example, a tablet computer with the conventional infrared touch panel includes a plurality of indication lights, such as a power light, a button light and a trademark light. Each indication light of the tablet computer is disposed on a lateral surface, or a frame adjacent to the lateral surface of the tablet computer. Difficulty of circuit disposition and mechanical disposition of the conventional infrared touch panel is increased due to the mechanical design constraint of the indication lights.

SUMMARY OF THE INVENTION

The present invention provides an electronic device with an invisible light touch panel, and a light guiding plate of the electronic device can be an indicating button or a light bar for decoration for solving above drawbacks.

According to the claimed invention, an electronic device with an invisible light touch panel is disclosed. The electronic device includes a circuit board, a visible light source, a light guiding plate, a panel and a cover. The circuit board includes a plurality of invisible light emitters and a plurality of invisible light receivers. The visible light source is disposed on the circuit board and located between the invisible light emitters and the invisible light receivers. The light guiding plate is disposed on the circuit board. The light guiding plate includes an active area and an inactive area. Invisible light outputted from the invisible light emitter is transmitted to the corresponding invisible light receiver via the active area, and visible light outputted from the visible light source is transmitted to the inactive area. The panel is disposed between the circuit board and the light guiding plate. The cover is disposed above the light guiding plate. A hole is formed on a surface of the cover, and a position of the hole corresponds to the inactive area on the light guiding plate, so that the visible light outputted from the visible light source is transmitted out of the cover via the inactive area and the hole.

According to the claimed invention, the electronic device further includes a base whereon the circuit board id disposed. The cover is connected to the base for covering the circuit board, the light guiding plate and the panel.

According to the claimed invention, a display area on the panel corresponds to the active area on the light guiding plate.

According to the claimed invention, a network is formed by the plurality of invisible light emitters and the plurality of invisible light receivers, and the network crosses over the active area and the inactive area on the light guiding plate.

According to the claimed invention, a dimension of the network is substantially greater than a display area on the panel.

According to the claimed invention, the plurality of invisible light emitters is disposed on a first side and a second side of the circuit board, and the plurality of invisible light receivers is disposed on a third side and a fourth side of the circuit board.

According to the claimed invention, the first side is adjacent to the second side, the third side is adjacent to the fourth side, and the first side is opposite to the third side.

According to the claimed invention, a transection of the light guiding plate is a U-shaped structure, the U-shaped structure includes a body and two lateral portions, and the two lateral portions are respectively connected to two edges of the body.

According to the claimed invention, the visible light source is disposed under the panel, the visible light outputted from the visible light source is transmitted to the inactive area on the light guiding plate through a curved portion of the light guiding plate, and the inactive area on the light guiding plate is above the panel.

According to the claimed invention, the curved portion is the lateral portion of the U-shaped structure.

According to the claimed invention, the invisible light emitter is covered by dyeing resin, and the light guiding plate is a transparent light guiding plate.

According to the claimed invention, the electronic device further includes a light guiding pillar connected to the light guiding plate. The light guiding pillar guides the visible light to an indicating button.

According to the claimed invention, the light guiding pillar is integrated with the light guiding plate monolithically.

The present invention utilizes the inactive area on the light guiding plate to be the indication button and the decoration bar, so as to decrease modeling cost and to increase diversity of the industry design. Therefore, the light guiding plate of the present invention can decrease manufacturing cost of the product, and economize the inner space of the electronic device for providing other use of circuit design and mechanism design.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
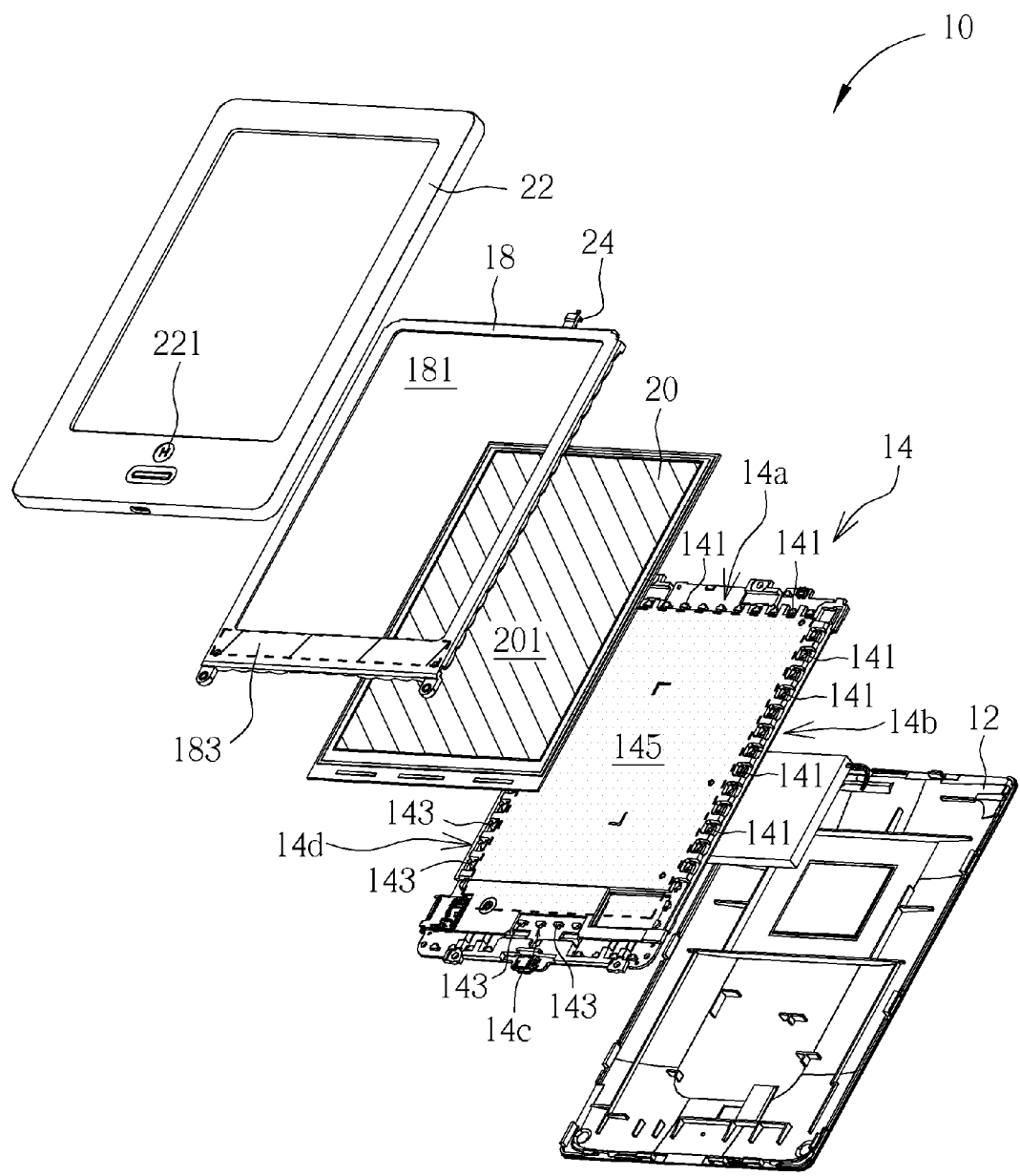
FIG. 1 and FIG. 2 respectively are exploded diagrams of an electronic device in different views according to an embodiment of the present invention.
Figure 2:
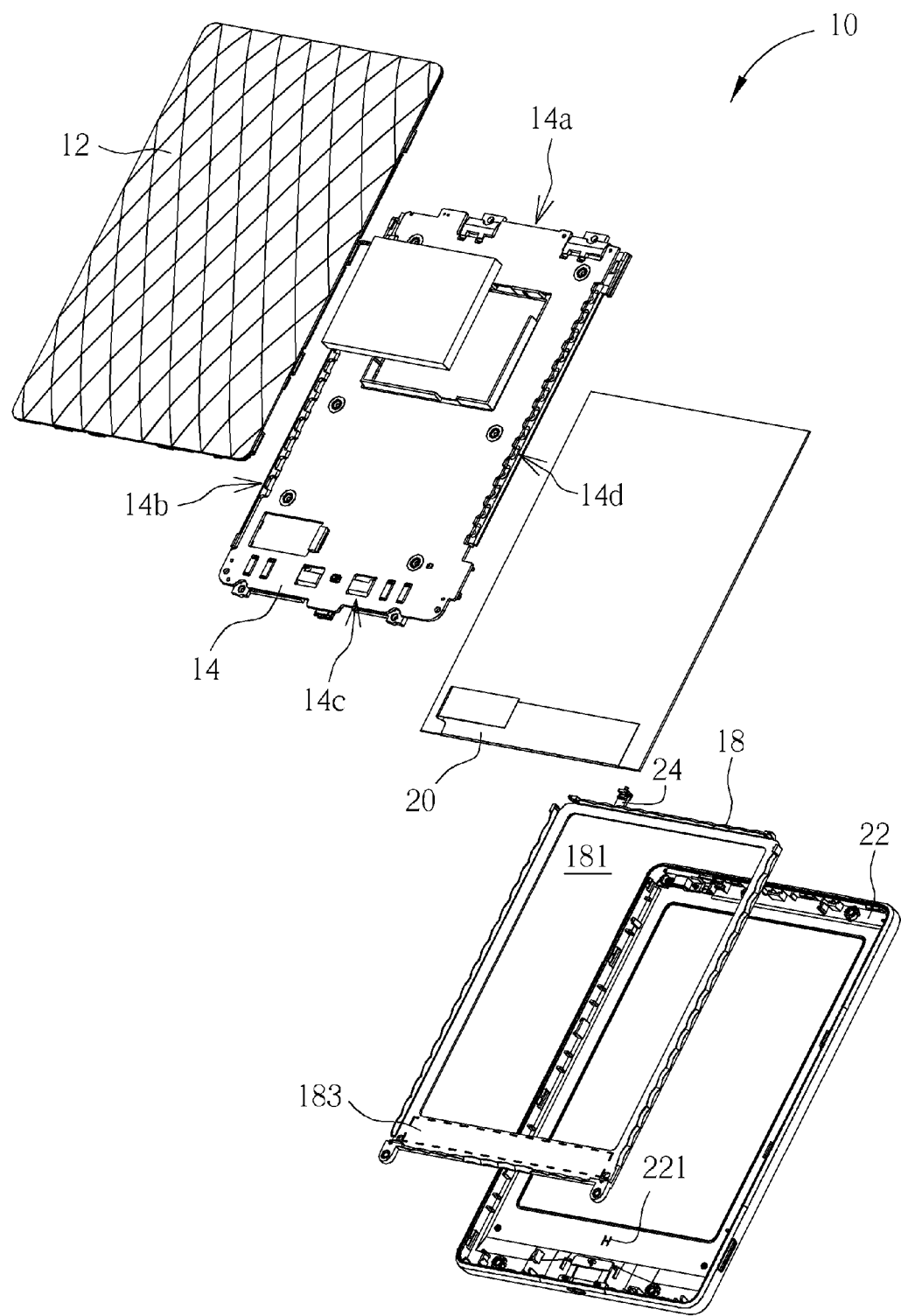
Figure 3:
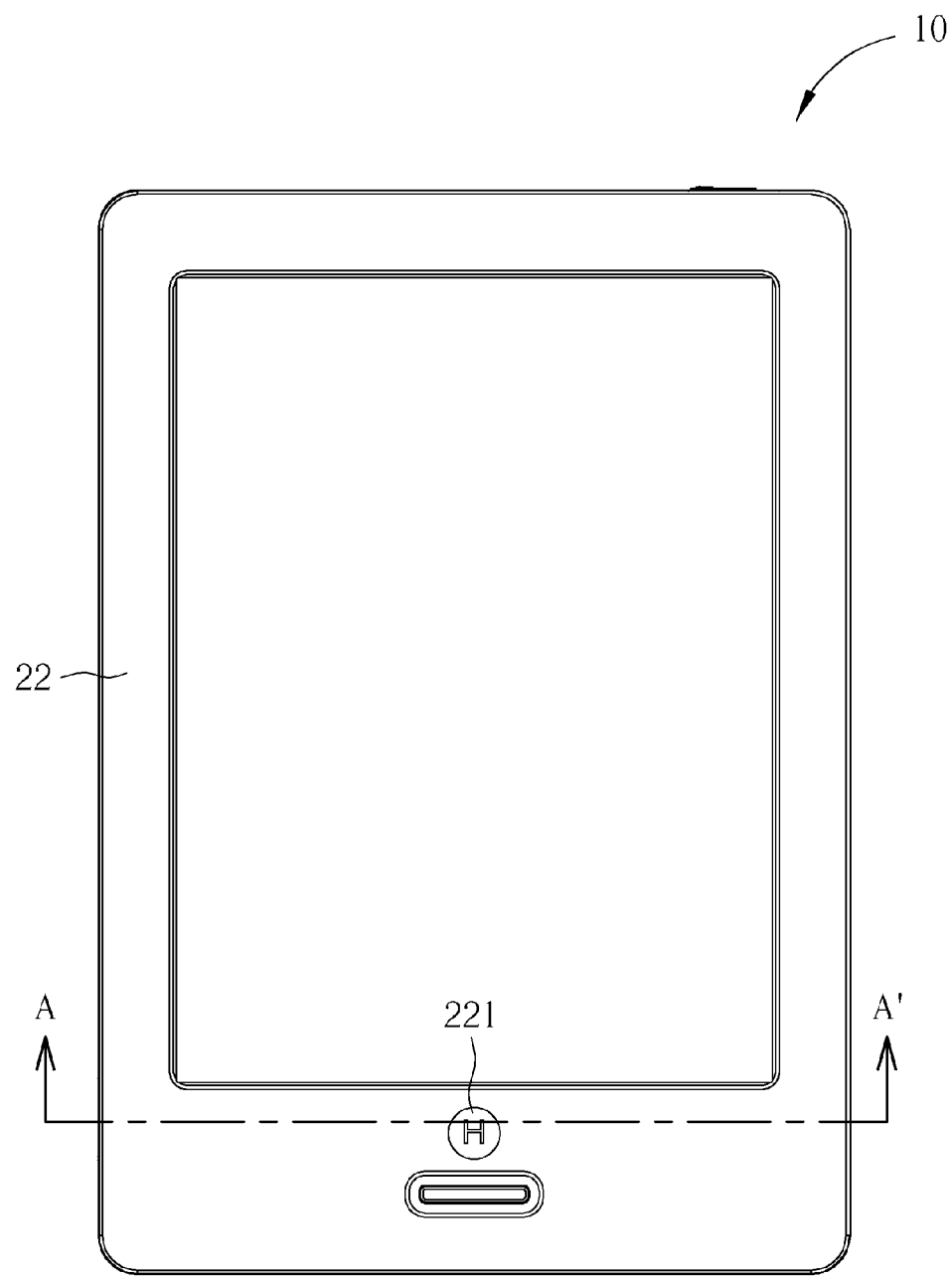
FIG. 3 is an assembly diagram of the electronic device according to the embodiment of the present invention.
Figure 4:
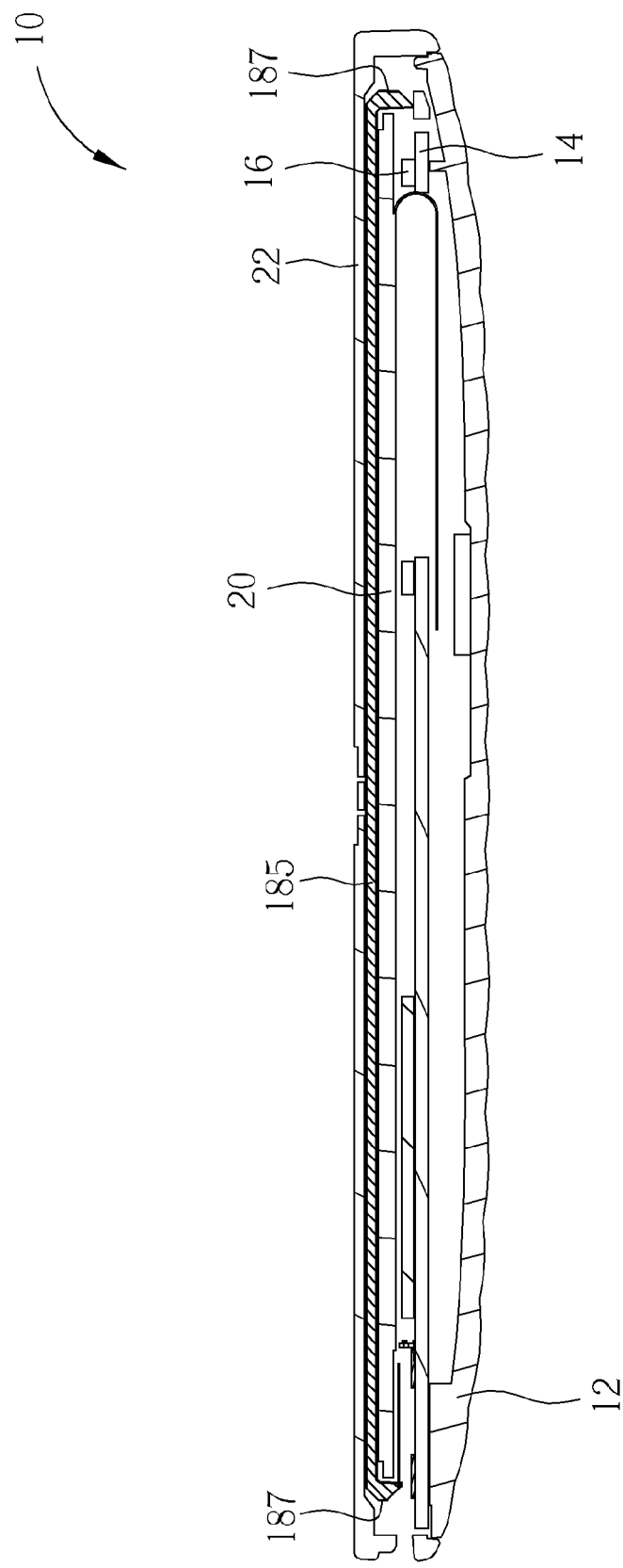
FIG. 4 is a sectional view of the electronic device according to the embodiment of the present invention.

Please refer to FIG. 1 to FIG. 4. FIG. 1 and FIG. 2 respectively are exploded diagrams of an electronic device 10 in different views according to an embodiment of the present invention. FIG. 3 is an assembly diagram of the electronic device 10 according to the embodiment of the present invention. FIG. 4 is a sectional view of the electronic device 10 along Line A-A' according to the embodiment of the present invention. The electronic device 10 of the present invention can be a tablet computer with an invisible light touch panel. The invisible light touch panel can be an infrared touch panel, and the infrared touch panel utilizes a plurality of infrared emitters and a plurality of infrared receivers to form an infrared network above a surface of the touch panel. When an object moves into the infrared network to contact the touch panel, an infrared signal emitted from the infrared emitter is interfered, the corresponding infrared receiver receives the interfered infrared signal, and a processor of the tablet computer can analyze signal interference to calculate position information of the object put over the touch panel.

As shown in FIG. 1 to FIG. 4, the electronic device 10 includes a base 12, a circuit board 14, a visible light source 16, a light guiding plate 18, a panel 20 and a cover 22. The base 12 and the cover 22 can be external protection components of the electronic device 10. The circuit board 14 is disposed on the base 12, and the circuit board 14 includes a plurality of invisible light emitters 141 and a plurality of invisible light receivers 143. The visible light source 16 can be a light emitting diode (LED). The visible light source 16 is disposed on the circuit board 14, and located between a row of the invisible light emitters 141 and a row of the invisible light receivers 143.

The light guiding plate 18 is disposed on the circuit board 14. The light guiding plate 18 includes an active area 181 and an inactive area 183. The active area 181 overlaps the touch network that is formed by the invisible light emitters 141 and the invisible light receivers 143. The inactive area 183 can receive visible light outputted from the visible light source 16. The panel 20 is disposed between the circuit board 14 and the light guiding plate 18. The cover 22 is disposed above the light guiding plate 18, and is connected to the base 12 for covering the circuit board 14, the light guiding plate 18 and the panel 20. The light guiding plate 18 and the cover 22 can respectively be a frame structure. The panel 20 can show image information, so that a user can view the image information from the panel 20 through hollow space of the frame structures (the light guiding plate 18 and the cover 22).

Invisible light outputted from the invisible light emitter 141, such as the infrared signal, can be transmitted to the corresponding invisible light receiver 143 via the active area 181 on the light guiding plate 18, so as to form the network with interlaced invisible light. The visible light outputted from the visible light source 16, such as red light, green light and blue light, can be transmitted to the inactive area 183 on the light guiding plate 18, so that the light guiding plate 18 can perform colorful appearance. A hole 221 can be formed on a surface of the cover 22. A position of the hole 221 corresponds to the inactive area 183 of the light guiding plate 18, and the visible light outputted from the visible light source 16 can be transmitted out of the cover 22 through the inactive area 183 and the hole 221. A shape and a dimension of the hole 221 can be designed according to product demand, for example, the shape of the hole 221 can be designed as symbol of product trademark. The present invention can utilize the hole 221, the visible light source 16, and the light guiding plate 18, which is applied to the touch panel (with the circuit board 14, the invisible light emitter 141 and the invisible light receiver 143), to present an indication light, so the electronic device 10 can have preferable aesthetic.

It should be mentioned that the invisible light emitter 141 can be a photodiode covered by dyeing resin. Noise can be filtered by the invisible light emitter 141 with the dyeing resin. Instead of a conventional dyeing light guiding plate, the present invention can utilize the transparent light guiding plate 18 to keep touch detection sensitivity of the electronic device 10. The present invention can select spectrum of the visible light source 16 according to design demand. The visible light source 16 can be composed of the red light, the green light, the blue light and the yellow light, and a pattern displayed by the hole 221 on the cover 22 can have arbitrary dimension, color and shape for decoration.

Figure 5:
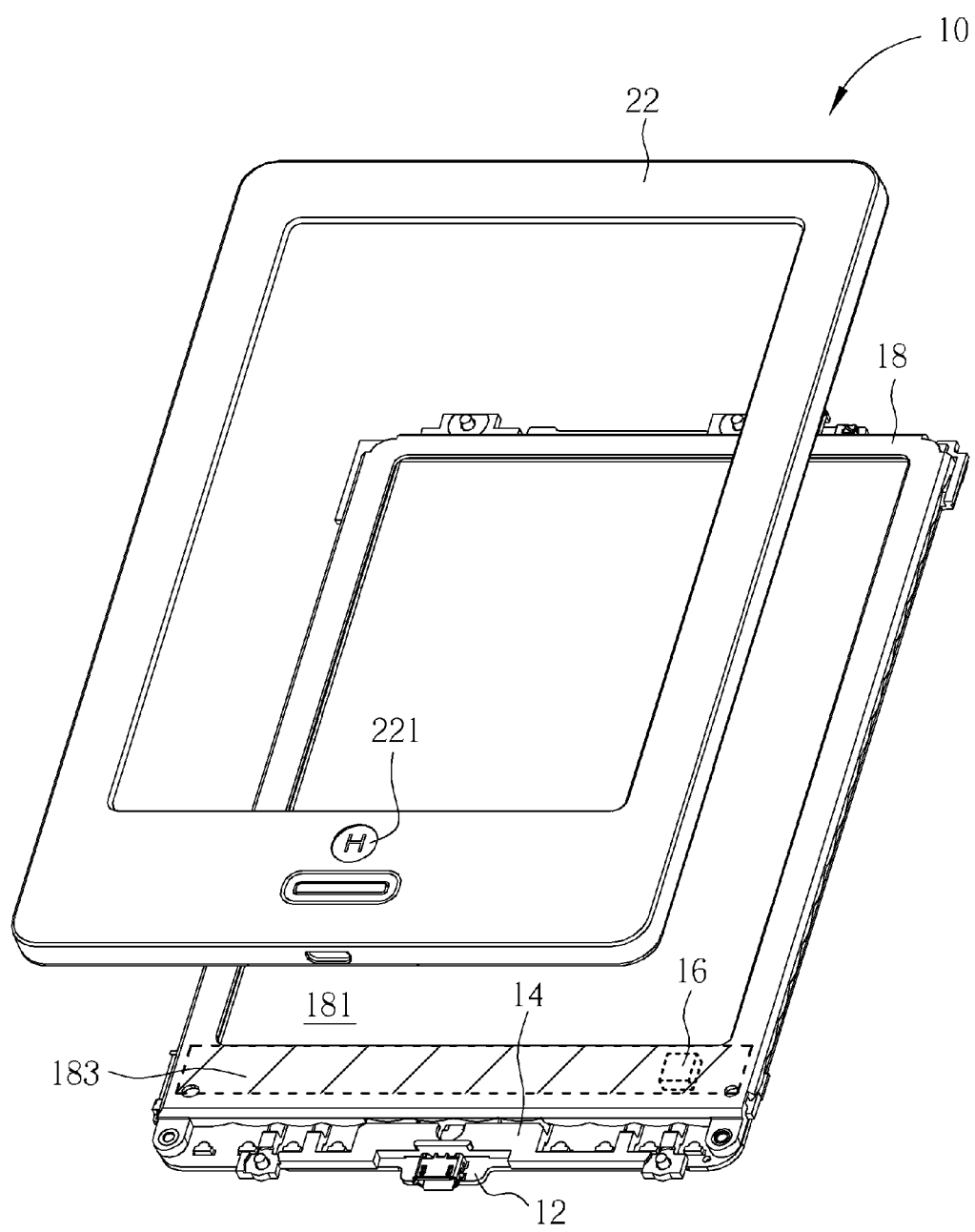
FIG. 5 is a diagram of the electronic device according to the embodiment of the present invention.

Please refer to FIG. 4 and FIG. 5. FIG. 5 is a diagram of the electronic device 10 according to the embodiment of the present invention. As shown in FIG. 4, a transection of the light guiding plate 18 can be a U-shaped structure. The U-shaped structure can include a body 185 and two lateral portions 187, and the lateral portions 187 are respectively connected to two edges of the body 185. The visible light source 16 is disposed above the circuit board 14 and located under the panel 20, so the visible light outputted from the visible light source 16 can be guided to the body 185 via a curved portion (the lateral portion 187) of the light guiding plate 18, so the inactive area 183 above the panel 20 can be full of the visible light, and the colorful pattern is performed through the hole 221 on the cover 22.

As shown in FIG. 1 and FIG. 5, the plurality of invisible light emitters 141 can be disposed on a first side 14a and a second side 14b of the circuit board 14, and the plurality of invisible light receivers 143 can be disposed on a third side 14c and a fourth side 14d of the circuit board 14. The first side 14a is adjacent to the second side 14b, the third side 14c is adjacent to the fourth side 14d, and the first side 14a is opposite to the third side 14c. Thus, the first side 14a, the second side 14b, the third side 14c and the fourth side 14d are edges surrounding the circuit board 14 in sequence. The invisible light outputted from each invisible light emitter 141 can be transmitted into the inactive area 181 on the light guiding plate 18, and be received by the correspond invisible light receiver 143, so that optical paths between the plurality of invisible light emitters 141 and the plurality of invisible light receivers 143 can form an invisible network 145 over the surface of the panel 20.

In the embodiment of the present invention, the invisible network 145 can a rectangle network surrounding by the invisible light emitters 141 and the invisible light receivers 143. The invisible network 145 can cross over the active area 181 and the inactive area 183 on the light guiding plate 18. However, the invisible light receivers 143 merely receive the invisible light, so function of the invisible light receivers 143 is not affected by the inactive area 183 full of the visible light, which means the invisible network 145 can keep preferable touch detection sensitivity.

Due to design of the invisible light touch panel, a display area 201 on the panel 20 can correspond to the active area 181 on the light guiding plate 18, and not overlap the inactive area 183 on the light guiding plate 18, which means a dimension of the invisible network 145 can be substantially greater than a dimension of the display area 201. The present invention utilizes a part of the invisible network 145 that does not overlap the display area 201 (the inactive area 183 on the light guiding plate 18), to be a light guiding component for guiding the visible light from the visible light source 16 to out of the cover 22 through the hole 221.

As shown in FIG. 4 and FIG. 5, the light guiding plate 18 of the present invention not only can guide the invisible light from the invisible light emitters 141 to the corresponding invisible light receivers 143 for forming the invisible network 145, but also can guide the visible light outputted from the visible light source 16 to the inactive area 183 on the light guiding plate 18, so that the inactive area 183 can perform color of the visible light source 16. A reflection structure can be formed between the body 185 and the lateral portion 187 of the light guiding plate 18 in the present invention. An angle of the reflection structure can be equal to a radian measure of the curved portion, such as 45 degrees. The visible light outputted from the visible light source 16 can be guided to go around the panel 20 by the reflection structure, and then be transmitted out of the cover 22 through the hole 221. Design parameter of the reflection structure of the light guiding plate 18 is designed according to actual structural disposition, and detailed description is omitted herein for simplicity.

Besides, the electronic device 10 can further include a light guiding pillar 24, as shown in FIG. 1 and FIG. 2. The light guiding pillar 24 can be connected to the light guiding plate 18 for guiding the visible light from the visible light source 16 to an indication button. For example, the visible light source 16 is shut down when the electronic device 10 is closed, and there is no visible light performs through the hole 221 on the cover 22. When the electronic device 10 is started, the invisible light emitters 141, the invisible light receivers 143 and the visible light source 16 can be actuated simultaneously. The light guiding plate 18 can guide the invisible light to form the invisible network 145, and can further guide the visible light out of the hole 221. According to the shape and the dimension of the hole 221, the present invention can have a shining trademark that be lighted as starting the electronic device 10.

At this time, the light guiding pillar 24 can further guide the visible light from the light guiding plate 18 to a power button, which can be the above-mentioned indication button. When the power button is pressed, the electronic device 10 is started, and the power button can simultaneously perform the visible light by a combination of the visible light source 16, the light guiding plate 18 and the light guiding pillar 24, so as to prompt a message that the electronic device 10 has been started. The light guiding pillar 24 can be integrated with the light guiding plate 18 monolithically for economizing inner space of the electronic device 10.

In conclusion, the electronic device of the present invention includes the light guiding plate that is divided into the active area and the inactive area. The light guiding plate utilizes the active area to guide the invisible light for forming the invisible network, so as to be applied to the touch detection of the panel. The light guiding plate can further guide the visible light from the visible light source to uniformly spread on the inactive area, and transmit the visible light out of the cover through the hole with specific design. The shape and the dimension of the hole can be designed according to industry appearance demand for being a decoration bar, and the user can view the shining pattern on the cover by the decoration bar when the electronic device is started. The shining pattern can be the trademark of the electronic device. In addition, the present invention can further utilize the light guiding pillar to guide the visible light from the visible light source to the power button, so as to economize the inner space and assembly cost of the light guiding unit for the power button, and to increase plasticity of the industry design.

Comparing to the prior art, the present invention utilizes the inactive area on the light guiding plate to be the indication button and the decoration bar, so as to decrease modeling cost and to increase diversity of the industry design. Therefore, the light guiding plate of the present invention can decrease manufacturing cost of the product, and economize the inner space of the electronic device for providing other use of circuit design and mechanism design.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device with an invisible light touch panel, the electronic device comprising:
   a circuit board, the circuit board comprising a plurality of invisible light emitters and a plurality of invisible light receivers;
   a visible light source disposed on the circuit board and located between the invisible light emitters and the invisible light receivers;
   a light guiding plate disposed on the circuit board, the light guiding plate comprising an active area and an inactive area, invisible light outputted from the invisible light emitter transmitting to the corresponding invisible light receiver via the active area, and visible light outputted from the visible light source transmitting to the inactive area;
   a panel disposed between the circuit board and the light guiding plate;
   a cover disposed above the light guiding plate, a hole being formed on a surface of the cover, and a position of the hole corresponding to the inactive area on the light guiding plate, so that the visible light outputted from the visible light source is transmitted out of the cover via the inactive area and the hole; and
   a light guiding pillar connected to the light guiding plate, the light guiding pillar guiding the visible light to an indicating button.

2. The electronic device of claim 1, further comprising:
   a base whereon the circuit board is disposed, the cover being connected to the base for covering the circuit board, the light guiding plate and the panel.

3. The electronic device of claim 1, wherein a display area on the panel corresponds to the active area on the light guiding plate.

4. The electronic device of claim 1, wherein a network is formed by the plurality of invisible light emitters and the plurality of invisible light receivers, and the network crosses over the active area and the inactive area on the light guiding plate.

5. The electronic device of claim 4, wherein a dimension of the network is substantially greater than a display area on the panel.

6. The electronic device of claim 1, wherein the plurality of invisible light emitters is disposed on a first side and a second side of the circuit board, and the plurality of invisible light receivers is disposed on a third side and a fourth side of the circuit board.

7. The electronic device of claim 6, wherein the first side is adjacent to the second side, the third side is adjacent to the fourth side, and the first side is opposite to the third side.

8. The electronic device of claim 1, wherein a transection of the light guiding plate is a U-shaped structure, the U-shaped structure includes a body and two lateral portions, and the two lateral portions are respectively connected to two edges of the body.

9. The electronic device of claim 8, wherein the visible light source is disposed under the panel, the visible light outputted from the visible light source is transmitted to the inactive area on the light guiding plate through a curved portion of the light guiding plate, and the inactive area on the light guiding plate is above the panel.

10. The electronic device of claim 9, wherein the curved portion is the lateral portion of the U-shaped structure.

11. The electronic device of claim 1, wherein the invisible light emitter is covered by dyeing resin, and the light guiding plate is a transparent light guiding plate.

12. The electronic device of claim 1, wherein the light guiding pillar is integrated with the light guiding plate monolithically.

* * * * *